United States Patent [19]

Kuzub

[11] Patent Number: 5,099,986
[45] Date of Patent: Mar. 31, 1992

[54] TELESCOPIC AUGER

[76] Inventor: Danny S. Kuzub, Box 878, Whitewood, Saskatchewan, Canada, S0G 5C0

[21] Appl. No.: 654,539

[22] Filed: Feb. 13, 1991

Related U.S. Application Data

[63] Continuation-in-part of Ser. No. 543,866, Jun. 20, 1990, Pat. No. 5,099,984.

[51] Int. Cl.$^5$ .............................................. B65G 33/32
[52] U.S. Cl. ................................... 198/666; 198/659; 414/310
[58] Field of Search ............... 198/518, 608, 659, 660, 198/666; 414/310, 311, 312, 326

[56] References Cited

U.S. PATENT DOCUMENTS

| | | | |
|---|---|---|---|
| 3,151,749 | 10/1964 | Long | 414/310 |
| 3,356,235 | 12/1967 | Laidig | 198/666 X |
| 3,727,746 | 4/1973 | Slusher | 198/659 |
| 4,029,219 | 6/1977 | Rutten et al. | 414/310 |
| 4,356,910 | 11/1982 | Togstad | 198/666 X |
| 4,530,429 | 7/1985 | Erickson | 198/666 X |
| 4,585,385 | 4/1986 | Buschbom et al. | 414/310 X |
| 4,619,577 | 10/1986 | Swanson | 414/312 |
| 4,669,941 | 6/1987 | West et al. | 198/518 X |

FOREIGN PATENT DOCUMENTS

| | | | |
|---|---|---|---|
| 3233128A1 | 7/1982 | Fed. Rep. of Germany . | |
| GB80/00086 | 9/1980 | PCT Int'l Appl. . | |
| 0249265 | 1/1970 | U.S.S.R. | 198/666 |
| 0727533 | 4/1980 | U.S.S.R. | 198/666 |
| 1435511 | 11/1988 | U.S.S.R. | 198/666 |

Primary Examiner—H. Grant Skaggs
Assistant Examiner—James R. Bidwell
Attorney, Agent, or Firm—Adrian D. Battison; Stanley G. Ade; Murray E. Thrift

[57] ABSTRACT

A telescopic auger includes a first drive tube and a second drive member coaxial with the drive tube and slidable inside the drive tube in telescopic manner. A flight is attached to the drive tube in helical arrangement. A second flight section is attached to the drive member at an outer end only of the drive member with the second flight being threaded into the end of the first flight so that rotation of one relative to the other causes the length of the threaded engagement to increase or decrease to allow telescopic adjustment of the length of the total auger flight. This arrangement can be used in a bin sweep which allows the sweep to be adjusted in length to accommodate bins of different diameter. The sweep section is driven across the ground by a drive track at an outer end of the auger section. The auger section is coupled to a main auger section which extends from the center of the bin outwardly to the exterior of the bin by a flexible or rotary joint which allows the sweep section to rotate through 360° during operation. The rotary joint is provided by a flexible auger core to which is attached a plurality of separate collars each carrying a helical flight section. The total drive for the system can therefore be provided by a motor at an outer end of the main auger section.

20 Claims, 7 Drawing Sheets

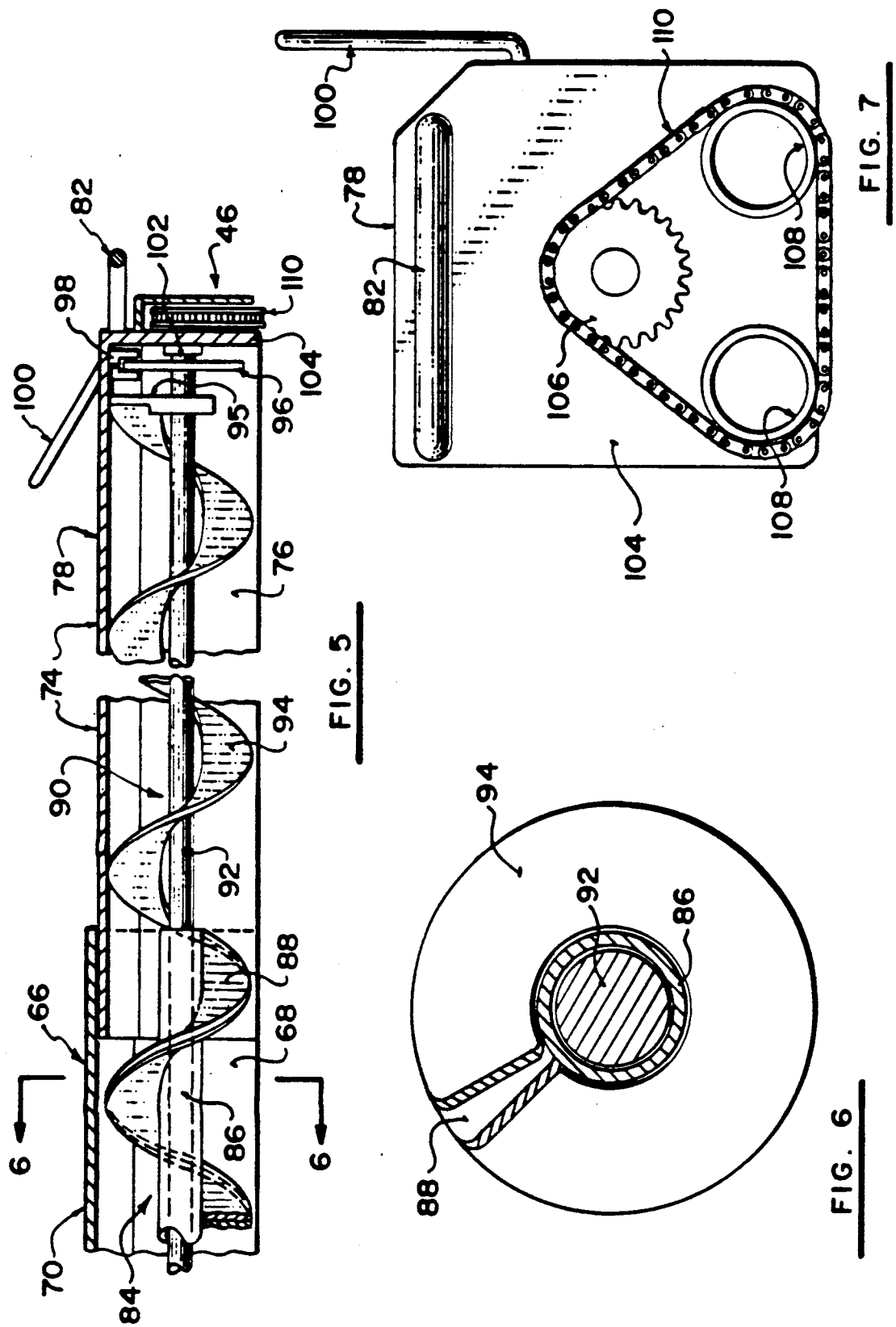

TELESCOPIC AUGER

This application is a continuation-in-part of application Ser. No. 543,866 filed June 20, 1990, now issued as U.S. Pat. No. 5,099,984.

FIELD OF THE INVENTION

The present invention relates to augers for transporting materials and particularly but not exclusively to an auger assembly which can be used as a bin sweep for clearing a bin floor of the stored particulate material.

BACKGROUND

Augers are used in many locations for transporting various particular materials. An auger comprises a helical flighting mounted on an elongate drive member so that the flighting is rotated around the axis of the drive member. The flighting is mounted within a confining member or shroud which may be in the form of a tube, or may have one side open and cooperates with the flighting to force the material longitudinally of the axis. One example of an auger is that of a bin sweep, which is a device for drawing grain across the bin floor to the inlet of a main unloading auger.

Bin sweeps which are attached at the lower end which is the feed end of a main auger are well known and arranged to be coupled to the lower end of the main auger to be driven by that lower end and include a helical flight to sweep the material from the bin toward the lower end for transportation along the main auger. An example of this device is shown in U.S. Pat. No. 2,640,577 (Roscoe). These devices have many disadvantages in that they do carry out much shoveling. In particular the sweep cannot rotate fully around the lower end of the auger and is limited to a certain arc within the bin. In addition the sweep is of a fixed length so that it cannot accommodate different sized of bins.

Another example of a device of this type is shown in U.S. Pat. No. 2,763,362 (Greaves) which shows a sweep of this general type which is coupled together in three lengths to attempt to increase the amount of area which can be swept but again there are many problems. A further older device is shown in U.S. Pat. No. 2,393,572 (Soma) which provides again a sweep of limited action but in this case the material is discharged through an air duct out of the bin. The sweep itself however remains with difficulty in covering the full area of the bin.

More recent devices shown in U.S. Pat. No. 4,669,941 (West) which shows the device which can pivot around a fixed point within a bin but again the sweeping arc of the device is limited and the device is necessarily fixed within a particular bin and cannot be used with more than one bin.

A yet further device is shown in the more recent U.S. Pat. No. 4,824,312 (Schiltz) which discloses a fixed duct mounted within the bin which extends from one wall to a central position at which there is a vertical auger section. At the bottom end of the vertical auger section is coupled a sweep auger which can rotate 360° around the bin floor. The sweep auger can be decoupled and removed but the remainder of the equipment remains coupled within the bin.

This device therefore has a number of disadvantages. Firstly the main part of the device remains fixed within a bin and therefore each bin requires a separate piece of equipment at accumulatively high cost. Secondly the device is associated with a particular diameter of bin and cannot be used with other types of bins. Thirdly the coupling between the auger section which extends outwardly of the wall of the bin, the vertical section and the sweep section is obtained by gear boxes located inside the auger tubes which thus seriously restrict the amount of flow which is obtained and thus significantly increases the amount of time necessary for cleanout of the bin. Furthermore the sweep auger section has a shroud around a rear part of the auger section to assist in transportation of the material but otherwise is uncovered and is driven by a large wheel at the outside end. This drive system will cause the auger once freed from the material to move rapidly around the floor of the bin which can be very dangerous to any user within the bin. Furthermore the exposure of the flight is again very dangerous in that the rapidly moving sweep can seriously damage the legs of the user if caught unaware within the bin.

Flexible couplings provided in an auger system are known for example in U.S. Pat. Nos. 3,092,241 (Dubie), 3,709,357 (Brown) and 3,727,746 (Slusher). The first of these patents provides a flexible sleeve formed in a plurality of movable sections together with a flexible core within the sleeve which carries a plurality of separate collars. However this provides a construction which has a very gradual radius of curvature so that the material must be lifted to a relatively high level by the inefficient auger system at the curved section thus significantly reducing the speed of transport of the material. In addition the design shown is totally unsuitable for use as a device for removing material from a bin. The further two patents of Brown and Slusher simply disclose flexible auger flights which curve around a required corner but which are unsuitable for use with particular material.

Auger systems which can be expanded or contracted in length are also known is U.S. Pat. Nos. 4,356,910 (Toggstad), 2,845,167 (Heiken), and 3,605,995 (Maack). In each of these cases an auger system includes a telescopic sleeve and an auger flight formed from two portions one of which can be screwed relative to the other to increase and decrease the amount of overlap between the two flight sections. In Heiken the movement is obtained by rotating an inner drive element carrying one flight portion relative to an outer drive element to thus provide the screw action following which the inner and outer drive elements are coupled by a transverse pin holding the auger at the required length. In Maack, the length of the device is controlled by fixing the length of the outer sleeves. In Toggstad the total length of the auger is controlled by either a cylinder system which moves the telescopic tube in and out or as shown in the drawings by a threaded rod which locks the outer end of the sleeve relative to the outer end of the first flight section. These devices are therefore difficult to adjust and accordingly are unsuitable for use where rapid adjustment is required for example in a bin sweep.

SUMMARY

It is one object of the present invention therefore to provide an auger, the length of which is adjustable.

It is a further object of the present invention to provide a bin sweep which overcomes or alleviates existing problems with bin sweeps.

According to a first aspect of the invention, there is provided a bin sweep comprising an auger having a first auger section having a first screw conveyor with a first core and a first helical flight secured therealong so as to be rotatable with the first core about an axis of the first core, a second auger section having a second screw conveyor with a second core mounted coaxially with the first core, one of the first and second cores being arranged as a tube such that the other of the first and second cores can slide longitudinally inside the tube, with an outer end of said other of the first and second cores projecting outwardly from an end of the tube, a second helical flight extending along the second core and having substantially the same pitch as the first helical flight, the helical flight secured to said other of the first and second cores being secured only at an outer end of the said other of the first and second cores and being otherwise unconnected thereto, the second flight being in threaded engagement with the first flight whereby relative rotation of the first and second helical flights allows telescoping of the auger to change the combined length of the screw conveyors, first drive means for causing rotation of the first and second auger sections about a common vertical axis at an inner end of the first auger section such that the auger sections can rotate around the vertical axis adjacent a vertical axis of a bin with the first and second screw conveyors transporting the material from the bin toward the vertical axis, second drive means connected to said first core so as to rotatably drive said first screw conveyor about the axis of the core, drive connecting means for communicating rotation from said first screw conveyor to said second screw conveyor being provided solely by contact between said first and second helical flights, such that the second screw conveyor tends to move freely longitudinally outwardly from the first screw conveyor under forces from material transported thereby and means actuable to temporarily inhibit rotation of the second screw conveyor so as to screw the second helical flight inwardly into the first helical flight.

According to a second aspect of the invention, there is provided a bin sweep comprising a first auger section having a screw conveyor with a first core and a first helical flight secured therealong so as to be rotatable with the first core about a longitudinal axis of the first core, a second auger section with a second core and a second helical flight screwed therealong so as to be rotatable with the second core about a longitudinal axis of the second core, means mounting the first auger section such that it can extend from a first feed end thereof within a bin to be emptied of a stored material to a second discharge end exteriorly of the bin for discharge of the material, means connecting the second auger section to the first end of the first auger section, said connecting means allowing rotation of the second auger section about a vertical axis defined on the first auger section such that the second auger section can rotate around the vertical axis through 360° within the bin to collect the material from an area surrounding said first end, drive means for drivingly rotating said second auger section about said vertical axis, and means for supporting the first auger section for transportation of the first auger section with the second auger section coupled thereto and supported thereby in cantilever manner from a bin to a second bin, said supporting means being arranged at said second discharge end of the first auger section such that the supporting means can be arranged exteriorly of the bin to insert the first auger section, said connecting means and said second auger section into a position adjacent a centre of the bin.

According to a third aspect of the invention, there is provided a bin sweep comprising a first auger section having a auger tube, a screw conveyor with a first core and a first helical flight secured therealong so as to be rotatable with the first core about a longitudinal axis of the first core within the auger tube, a second auger section having a shroud, a second core and a second helical flight secured therealong so as to be rotatable with the second core about a longitudinal axis of the second core within the shroud, means for supporting the first auger section with the second auger section coupled thereto and supported thereby in cantilever manner, said supporting means being arranged at said discharge end of the auger tube, such that the auger tube can extend from a first feed end thereof within a bin to be emptied of a stored material to a second discharge end exteriorly of the bin for discharge of the material, a first substantially right angle rigid tubular rigid elbow having a first end connected to and substantially contiguous with the auger tube, a second substantially right angle tubular elbow having a first end connected to the shroud, means coupling a second end of the first elbow to a second end of the second elbow, said coupling means allowing rotation between said first and second elbows to cause rotation of the second auger section about a vertical axis defined on the first auger section such that the second p auger section can rotate around the vertical axis through 360° within the bin to collect the material from an area surrounding said first end, drive means for drivingly rotating said second auger section about said vertical axis, and means for communicating rotation of said first core to said second core comprising a flexible core portion secured to an end of the first core and to an end of the second core, said flexible core portion extending through an interior of said first and second elbows and said coupling means, said flexible core portion carrying a plurality of separate collars thereon each having auger flight means thereon for transporting material through said elbows, and pivot coupling means mounting said shroud on said second elbow for pivotal movement of the shroud about a horizontal axis transverse to the length of the second auger section.

According to a fourth aspect of the invention, there is provided a bin sweep comprising a first auger section having a screw conveyor with a first core and a first helical flight secured therealong so as to be rotatable with the first core about a longitudinal axis of the first core, a second auger section with a second core and a second helical flight screwed therealong so as to be rotatable with the second core about a longitudinal axis of the second core, means mounting the first feed end thereof within a bin to be emptied of a stored material to a second discharge end exteriorly of the bin for discharge of the material, means coupling the second auger section to the first end of the first auger section, said coupling means allowing rotation of the second auger section about a vertical axis defined on the first auger section such that the second auger section can rotate around the vertical axis through 360° within the bin to collect the material from an area surrounding said first end, drive means for drivingly rotating said second auger section about said vertical axis, wherein said drive means comprises a drive element mounted on a said second core at an end thereof remote from said vertical axis and drivingly rotatable by said second core about a longitudinal axis of the core, the drive element having a peripheral surface surrounding the axis of the second core, and drive communication means driven by said peripheral surface of said drive element and arranged to communicate rotation of said peripheral surface of the drive element to a floor of the bin for movement of the second auger section around said vertical axis, said peripheral surface having a diameter less than that of a peripheral edge of the second helical flight and said drive communication means being arranged such that the speed of the movement of the second auger around said vertical axis is less than the angular velocity of the peripheral edge of the second helical flight around said axis of the second core.

According to a fifth aspect of the invention, there is provided a bin sweep comprising a first auger section having a screw conveyor with a first core and a first helical flight secured therealong so as to be rotatable with the first core about a longitudinal axis of the first core, a second auger section with a second core and a second helical flight screwed therealong so as to be rotatable with the second core about a longitudinal axis of the second core, means mounting the first auger section such that it can extend from a first feed end thereof within a bin to be emptied of a stored material to a second discharge end exteriorly of the bin for discharge of the material, means coupling the second auger section to the first end of the first auger section, said coupling means allowing rotation of the second auger section about a vertical axis defined on the first auger section such that the second auger section can rotate around the vertical axis through 360° within the bin to collect the material from an area surrounding said first end, drive means for drivingly rotating said second auger section about said vertical axis, said second auger section including shroud means extending along the length thereof, the shroud means including a top portion and a rear portion both of which are formed by a substantially imperforate sheet confining the material collected by the second helical flight for transportation by the flight along the shroud means to the first auger section, said shroud means further including a front portion defined by a grid structure having transversely spaced, longitudinally extending bars allowing entry of the material into the second auger section as the second auger section moves around said vertical axis.

According to a sixth aspect of the invention, there is provided an auger for transportation of particulate material comprising a first shroud member, a first auger section having a first screw conveyor mounted within the first shroud member with a first core and a first helical flight secured therealong so as to be rotatable with the first core about a longitudinal axis of the first shroud member, a second auger section having a second shroud member, a second screw conveyor mounted within the second shroud member with a second core mounted coaxially with the first core, one of the first and second cores being arranged as a tube such that the other of the first and second cores can slide longitudinally inside the tube, with an outer end of said other of the first and second cores projecting outwardly from an end of the tube, a second helical flight extending along the second core and having substantially the same pitch as the first helical flight, the helical flight secured to said other of the first and second cores being secured only at an outer end of the said other of the first and second cores and being otherwise unconnected thereto, the second flight being in threaded engagement with the first flight, said first core being free to rotate relative to the second core, said second shroud member being free to move longitudinally of the second shroud member to increase and decrease a combined effective length of the first and second shroud members, drive means connected to said first core so as to rotatably drive said first screw conveyor about the axis of the first core, drive connecting means for communicating rotation from said first screw conveyor to said second screw conveyor being provided solely by contact between said first and second helical flights, actuable to temporarily inhibit rotation of the second screw conveyor relative to the first screw conveyor so as to cause a screwing action of the second helical flight relative to the first helical flight to change the effective combined length of the first and second auger sections.

The telescopic bin sweep offers a wide range of bin sizes, for example, from 14' to 28' diameter.

The second auger section is preferably equipped with a brake that may be used to stop rotation of the second section, while the first section continues to be driven. This action may be used for a power extension or retraction of the sweep, depending on the direction of rotation of the screw.

It is also desirable to provide a transporting mechanism at the outer end of the second section, driven by the second core. This is used to swing the sweep through an arc while grain is drawn by the sweep into the main auger.

Another preferred characteristic of the invention is the coupling of the sweep to a main auger tube through the use of a rotary union including a flexible screw section. This includes a flexible shaft and double flighted screw 3 segments spaced along the flexible shaft. The flexible shaft is connected at its opposite ends to the sweep screw and the screw of the main auger so that a single hydraulic motor can drive the complete system. There is no discontinuity in the feed from the sweep through to the main auger outlet. This also allows the sweep to swing through 360° about the end of the main auger.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

BRIEF DESCRIPTION OF THE DRAWINGS

In the accompanying drawings, which illustrate an exemplary embodiment of the present invention:

FIG. 5 is a section of a bin sweep showing details of a sweep transport;

FIG. 6 is section along line 6—6 of FIG. 5;

FIG. 7 is an end view of the sweep transporting mechanism; mechanism; and

DETAILED DESCRIPTION

Figure 1:
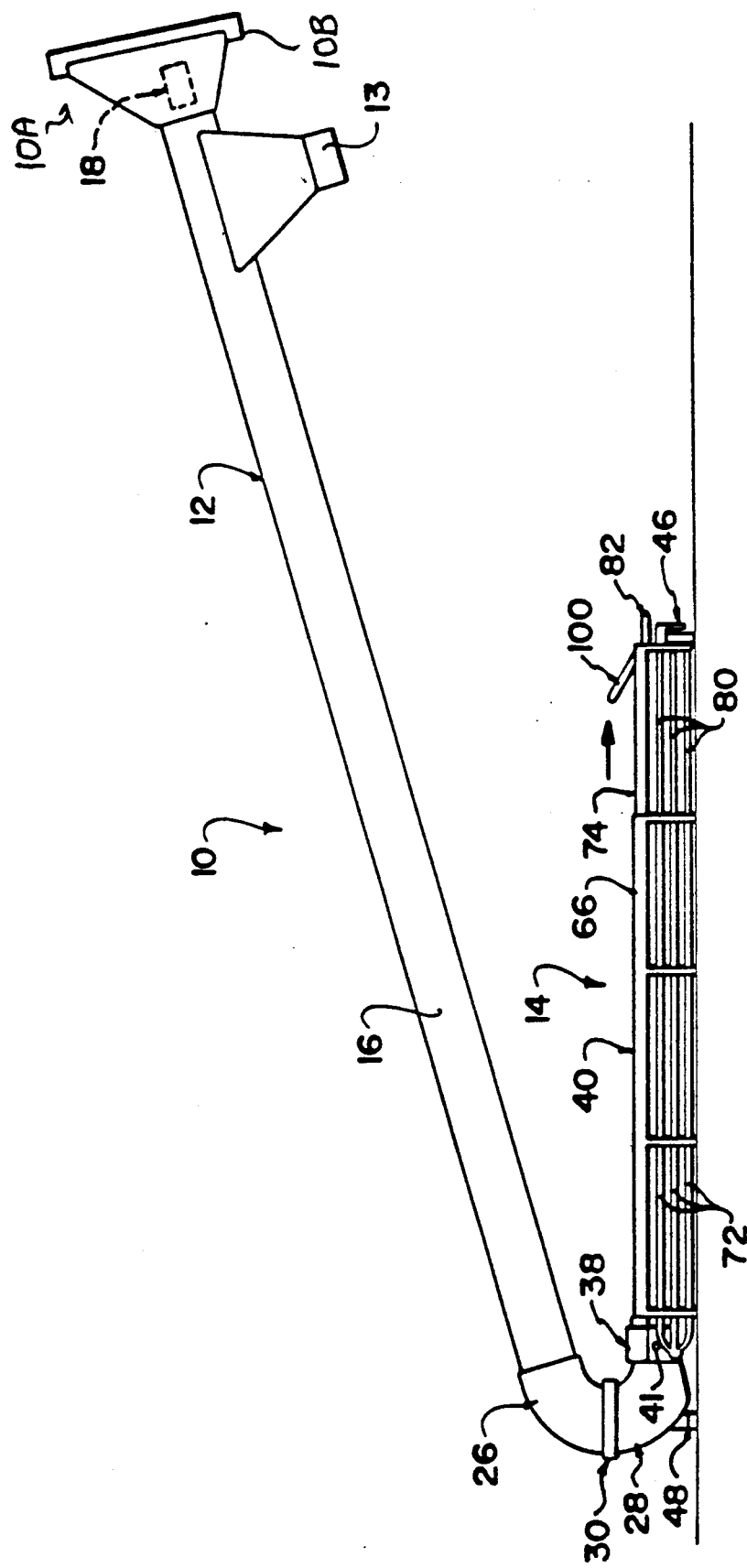
FIG. 1 is a side elevation of an unloading auger according to the present invention.
Figure 2:
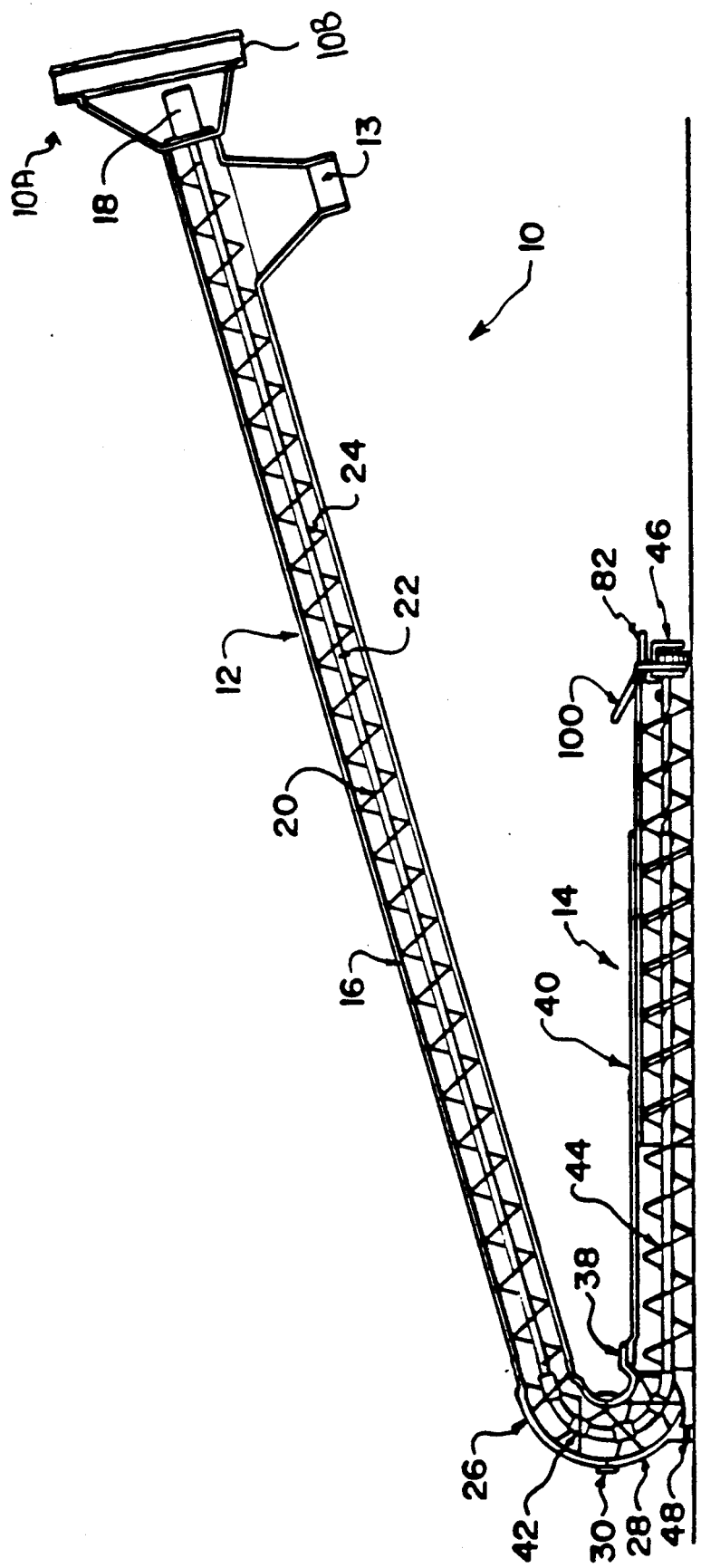
FIG. 2 is a side elevation like FIG. 1 in cross section.

Referring to the accompanying drawings, there is illustrated a bin sweep 10 including a main auger section 12 for delivering the grain through an outlet 13 for discharge into a hopper of a further transportation system. The auger also includes a sweep 14 for gathering grain from the floor of a bin and feeding it to the main auger 12.

The main auger includes an auger tube 16 carrying on its outer end an hydraulic motor 18. The motor 18 drives an auger screw 20 extending along the tube 16. Screw 20 includes a shaft 22 and helical flighting 24.

At the end of the main auger, opposite the hydraulic motor, the tube 16 is connected to a rigid tubular elbow 26. The elbow 26 is in turn connected to a second elbow 28 through a rotary joint 30. Both elbows turn through approximately 90° making a total of the order of 180°, but preferably slightly less than 100° to provide the configuration shown. The joint includes an annular ring 32 fixed to the elbow 26 and overlapping the confronting end of the elbow 28 and a radial flange 34 extending from the end of the ring 32 into an annular slot 36 in the elbow 28.

At the end of the elbow 28 opposite the rotary joint 30 is a shroud 38 that is connected to a sweep housing 40 through the use of two diametrically opposed pivot pins 41.

To feed grain through the two elbows 26 and 28, from the sweep screw to the main auger screw 20, there is a flexible auger screw section 42 that connects at one end to the screw 20 and at the opposite end to a sweep screw 44 that extends the length of the sweep housing 40. At the outer end of the housing 40 is a sweep transporting mechanism 46 that engages the floor and causes the sweep to rotate about the rotary joint 30. To facilitate this movement, the elbow 28 is supported on a stud 48 coaxial with the rotary joint 30.

Figure 3:
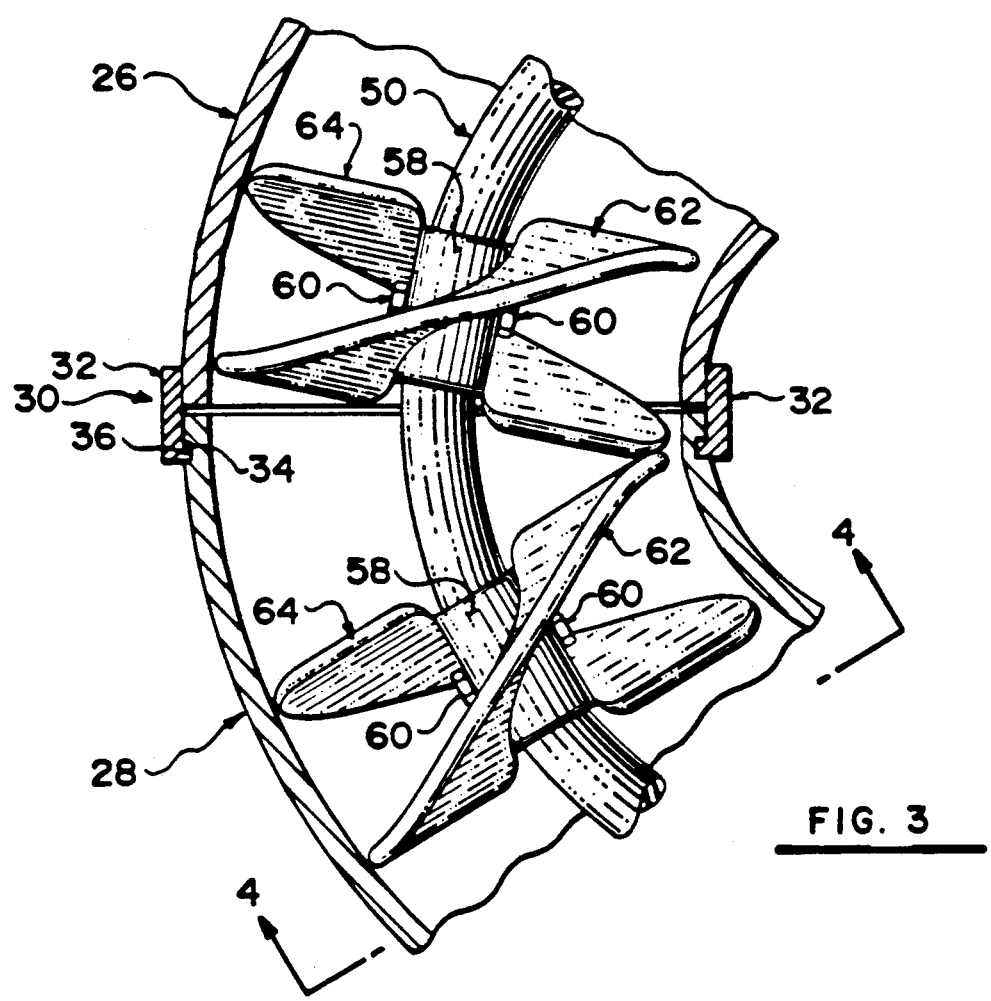
FIG. 3 is a detail of a flexible auger screw section.
Figure 4:
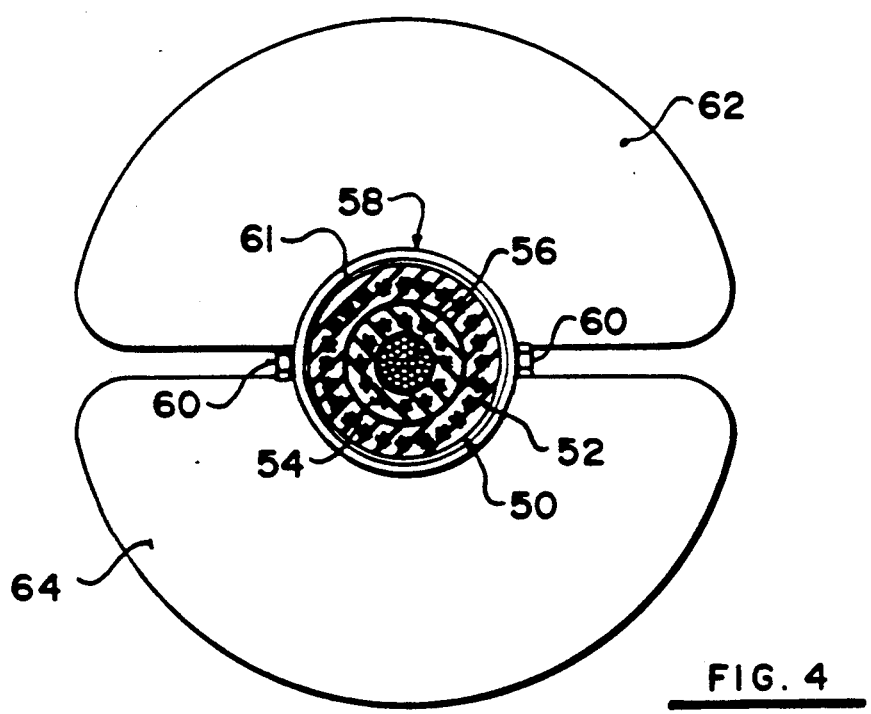
FIG. 4 is a cross section along line 4—4 of FIG. 3.

The configuration of the flexible screw section 42 is illustrated most clearly at FIGS. 3 and 4. The screw has a flexible shaft 50 that is composed of a four braid hydraulic high pressure hose 52 surrounding a smaller two braid hydraulic high pressure hose 54, which in turn surrounds a multi-strand cable 56 which serves as a core for the flexible shaft. The flighting on the shaft is sectional. Each section includes a sleeve 58 secured to the shaft with diametrically opposed self-tapping screws 60. A rubber sleeve 61 may be fitted between the shaft and the sleeve 58 where desired. The flighting includes two flight sections 62 and 64 connected to each sleeve 58. Each extends over substantially 180° of arc. The two flight sections are diametrically opposed, that is they are arranged 180° out of phase, so that during use, the sections serve to centre the flexible shaft in the curve of the two elbows 26 and 28.

The housing 40 of the sweep 14 is a telescopic housing having an outer section 66 with a back wall 68, a top wall 70 and a series of elongate grating tubes or bars 72 along the front side. The outer sweep housing is connected to the shroud 38 as discussed above. An inner sweep housing matches the outer housing in its overall shape. It includes a back wall 76 that slides along the inside of the back wall 68, a top wall 78 that slides on the underside of the top wall 70 and a series of grating rods or bars 80 that slide into the grating tubes 72 from their outer ends. A handle 82 is provided at the outer end of the sweep housing section 74. The outer sweep housing is thus freely longitudinally movable to increase or decrease the total effective length thereof.

Within the sweep is a fixed screw conveyor section 84 consisting of a tube 86 fixed at one end to the flexible shaft 50 of the flexible screw section 42. The tube 86 carries flighting 88 in a conventional way. This is combined with a telescoping screw conveyor section 90 that extends along the housing section 74. The screw section 90 includes a rod 92 that slides into the tube 86 and flighting 94 that is connected to the rod 92 only at the outer end 95 of the flighting. The helical flighting 94 is in threaded engagement with the flighting 88 of the fixed screw section so that it can be screwed in and out on the fixed section to shorten or lengthen the sweep auger.

At the outer end of the rod 92, beyond the end of the flighting 94 is a brake disc 96. This runs through a caliper 98 carried by the housing section 74. A brake lever 100 may be used selectively to engage the caliper with the brake disc, thus temporarily inhibiting or preventing rotation of the sweep screw section 90. If at the same time, the screw section 84 is rotated, the screw section 90 will be threaded either in or out, to shorten or lengthen the sweep according to the direction of rotation of the screw section 84.

The rod 92 is supported in a bearing 102 in the end wall 104 of the telescoping housing section 74. On the outside of the wall 104, the rod carries a chain sprocket 106 which has an outer diameter less than that of the periphery of the flight. Below the sprocket 106 and spaced apart are two tubular chain guides 108 that entrain a short transport chain 110 that is driven by the sprocket 106. Rotation of the rod 90 drives the sprocket 106 and thus the chain 110. The chain projects below the outer end of the housing 74 so that during operation of the sweep, the chain acts as a drive track. Consequently, the outer end of the sweep will be caused to swing in an arc about the rotary joint 30 where the two elbows 26 and 28 meet. As the diameter of the sprocket is reduced, the forward velocity of the anger is reduced relative to the angular velocity of the periphery of the flight, thus preventing the auger from moving at a relatively high speed across the floor which could catch the user unaware.

Where desired, the sweep can be lengthened or shortened by using the brake lever 100 and, where necessary, reversing the direction of rotation of the auger. The only communication of drive therefore from the screw conveyor 84 to the screw conveyor 90 is provided by the contact between the flights as there is no drive connection between the cores that is the rod 92 and the tube 86.

In use of the unloading auger, the sweep may be rotated through 360° around the rotary joint 30 to provide complete floor coverage. The telescoping action of the sweep can adjust the sweep length to suit bins of varying diameter.

Figure 8:
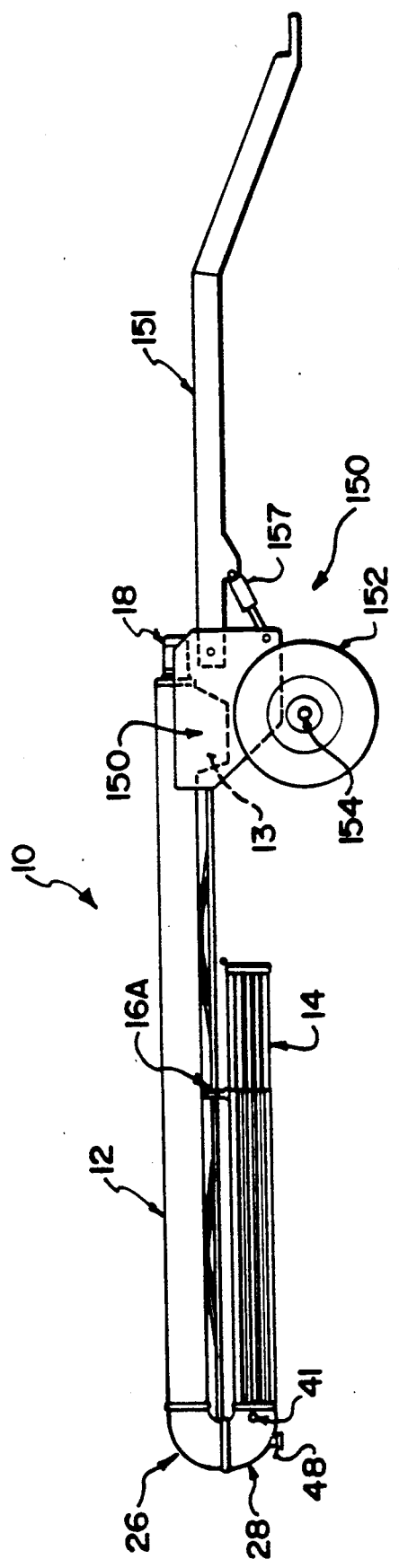
FIG. 8 is a side elevational of the auger attached to a support trailer in a raised position for transportation.

As shown schematically in FIG. 8, the pivotal action of the shroud and bin sweep section about the pins 41 allows the angle of the main auger section 12 to be varied in accordance with the requirements. In addition the shroud and bin sweep section can be lifted and attached by a hook mechanism 16A to the underside of the main auger section for storage and transportation.

For purposes of transportation the main auger section can be mounted upon a suitable support mechanism for example a trailer 150, the three point hitch of a conventional tractor, on a front end loader attachment of a tractor or it can be mounted directly upon a conventional grain auger preferably of the type having its own transportation system. The details of these devices are not shown but a cantilever support system is schematically indicated at 10A which provides a bracket for attachment to one of the above items, for example including a pin which extends through a sleeve 10B forming part of the bracket. In this way the whole device is cantilevered out from the support bracket and can be simply inserted into a bin by driving the support system toward the bin with the elbow 30 projecting forwardly so that this extends through an open door of the bin toward the centre of the bin for operation of the sweep section.

As shown in FIG. 8, the trailer includes a main longitudinal hitch beam 151. A pair of ground wheels 152 are mounted on rearwardly extending bifurcated section or saddle 153 pivotally mounted on a transverse axle 154. The saddle 153 supports the discharge end of the main auger section 12 in fixed position extending longitudinally outwardly from the saddle in a direction opposite to the hitch beam 151. The discharge spout 13 can thus discharge downwardly between legs of the saddle 153 and behind the hitch beam 151 into the hopper of a conventional auger or other device received between the wheel 152. The main auger section 12 can be pivoted about the axle 154 by actuation of a cylinder 157, which causes the saddle 153 and the main auger section carried thereby to pivot relative to the hitch beam 151 which is maintained horizontal by its coupling to the towing vehicle.

Figure 9:
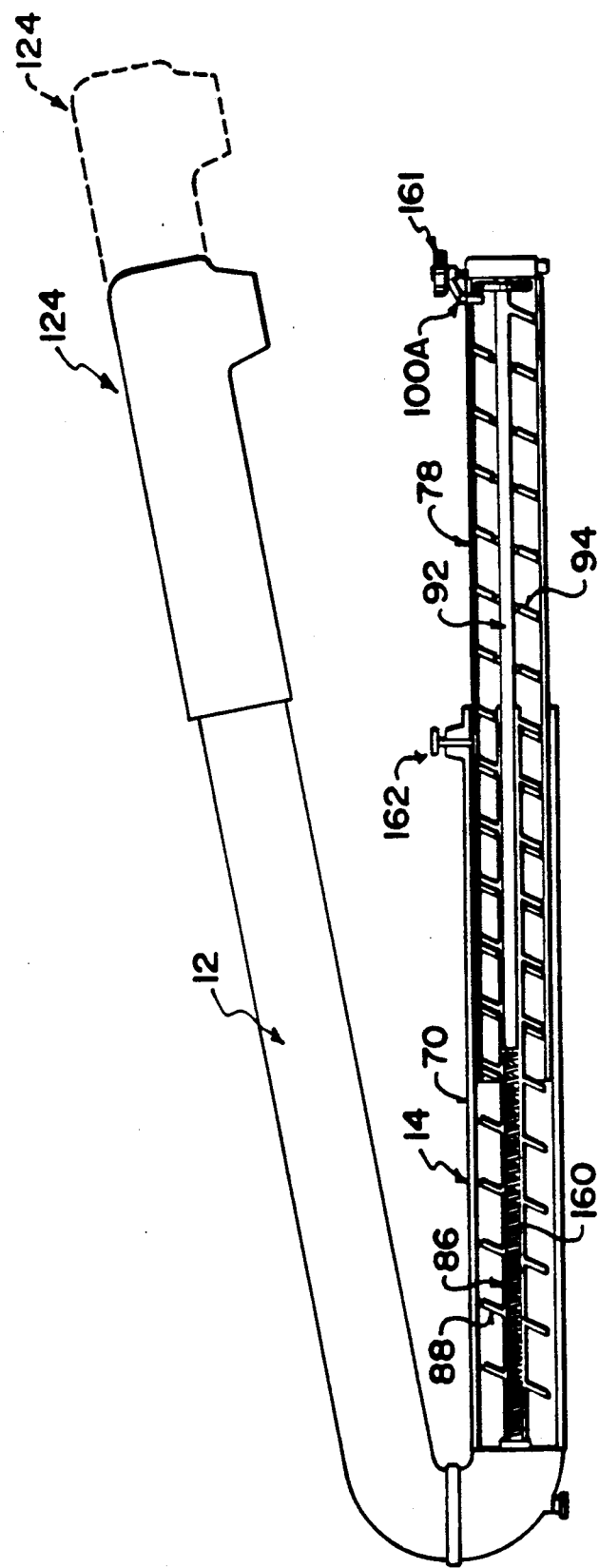
FIG. 9 is a schematic longitudinal cross-sectional view though a modified embodiment of the bin sweep.

The arrangement of the extendable first and second auger sections is such that when the device is operating in its conventional rotational mode so that the device is driven forwardly by the drive system 46, the outer auger flight section will automatically tend to extend or expand because of the resistance applied to the end section of flighting caused by the grain to be transported. This end section therefore tends to screw out into the pile of grain like a wood screw. This movement is allowed due to the absence of any locking mechanism on the combined length of the shrouds and due to the coupling between the cores being provided by the contact between the flights. As shown in FIG. 9, this tendency can be assisted by a coil spring 160 mounted in the tubular core 86 and acting to expel the core 92. This assists the automatic expansion in the situation where only a short length of the flight 94 is free to engage the material. Thus automatically the end section of the sweep extends to follow the edge of the grain bin. If however the sweep runs into an obstruction in the bin for example an angle iron or channel upright of the wall, this will cause the sweep to stop and the track drive system will slip on the floor. To retract the section of the sweep, the disc brake can simply be momentarily applied either directly by the operative within the bin or by the remote control and this will cause the outer section to automatically retract into the inner section to an extent sufficient to allow the device to go around the obstruction. The brake can also be applied automatically by a sensing gauge 161 in the form of a wheel projecting forwardly from the outer end of the auger section 14 and directly mechanically connected to the brake lever 100A. Alternatively, the sensing device can be an electronic eye acting to operate the brake electromechanically. The device then continues to rotate around the bin while the device automatically extends back to the maximum position. A pin latch 162 is provided which can fix the shrouds at a predetermined location.

Figure 10:
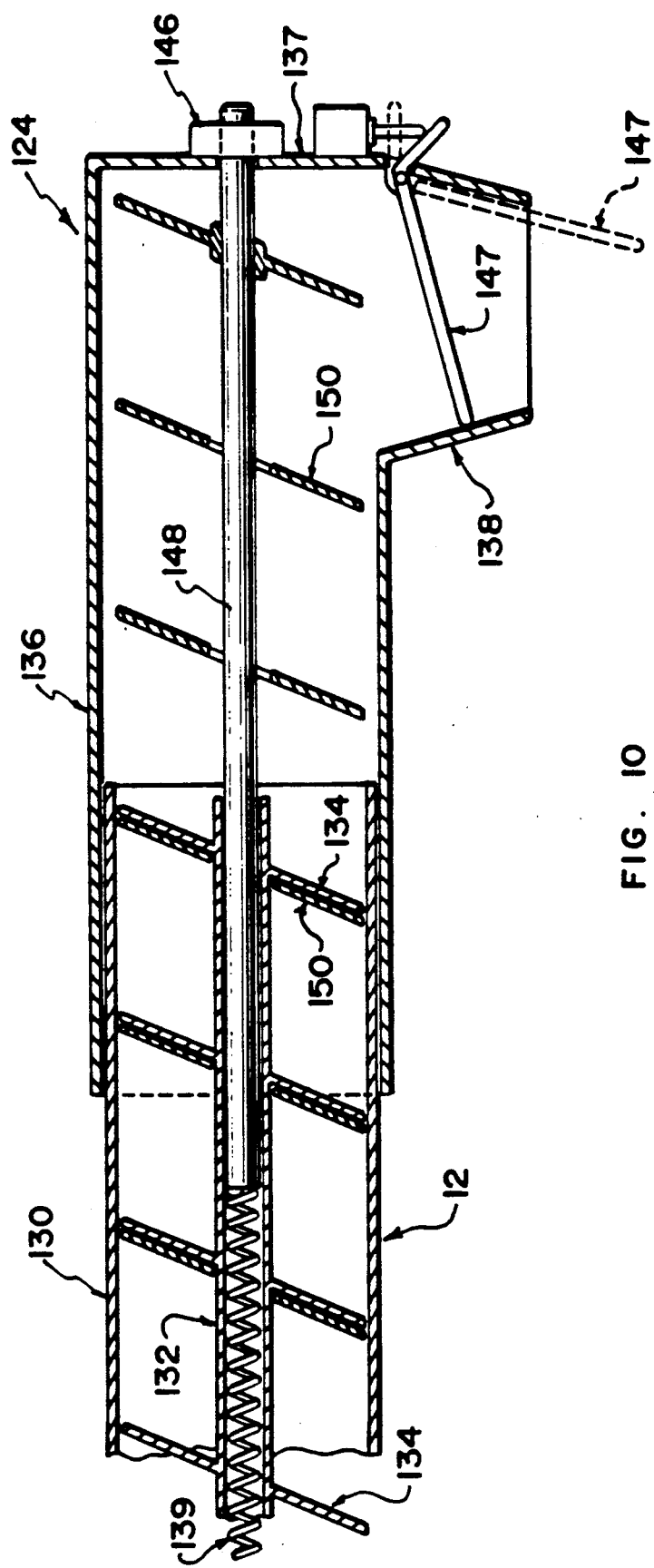
FIG. 10 is a schematic longitudinal cross-sectional view through an upper part of the bin sweep of FIG. 9 showing an adjustable discharge auger.

As shown in FIG. 10, the principle of the extendable auger system described previously is also applied to the discharge end 124 of the main auger 12. It can however also be applied to the discharge end of a conventional auger. In this case the auger comprises a first auger sleeve 130 within which is mounted a drive tube 132 which carries an auger flight 134 welded to the outside of the drive tube 132.

A further auger sleeve 136 is mounted coaxially with the sleeve 130 and slides outside the first sleeve 130 so that it can move longitudinally of the sleeve in a telescoping action. The sleeve 136 is closed at its outer end 137 and carries a bearing 146. A sidewall of the sleeve 136 includes a discharge spout 138.

Within the sleeve 136 is mounted a further auger core 148 which is of slightly smaller diameter than the tube 132 so that it can slide inside the tube 132 in a telescoping action. On the outside of the tube 148 is mounted a further flight 150 which again is attached solely at the outer end of the tube 150 and extends from that connection point freely along the tube 150 to engagement with an outer end portion of the flight 134. The flight 150 is thus constrained by its engagement with the tube 148 at one end and its engagement with the flight 134 at the other end.

A tension spring 139 is mounted inside the tube 132 so as to apply force to the core 148 tending to reduce the total effective length of the two screw conveyors. This retraction will be accommodated by increasing the amount of overlap between the auger flight sections 134 and 150 by screw threading the flight 150 into the flight 134 as previously explained.

At a rest position therefore, the total length of the auger is at a minimum which can be limited by suitable stops (not shown) if it is desired to increase the length of the auger to more the point of discharge from the mouth 138, the rotation of the outer flight 150 can be temporarily inhibited causing it to rotate relative to the flight 134 and thus to unscrew from the flight 134 to increase the effective length of the auger. In this case, the temporary inhibition of the rotation of flight 150 can be achieved by a brake or more simply can be obtained by a flap 147 which inhibits the escape of the particulate material through the mouth 138 and thus inhibits rotation of the flight 150 which cannot push further grain toward the mouth. At the same time the grain presses against the end wall 137 thus assisting the expansion action. Operation of the flap can thus cause the auger to expand and contract as required to keep the mouth 138 at a required location.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A bin sweep comprising an auger having a first auger section having a first screw conveyor with a first core and a first helical flight secured therealong so as to be rotatable with the first core about an axis of the first core, a second auger section having a second screw conveyor with a second core mounted coaxially with the first core, one of the first and second cores being arranged as a tube such that the other of the first and second cores can slide longitudinally inside the tube, with an outer end of said other of the first and second cores projecting outwardly from an end of the tube, a second helical flight extending along the second core and having substantially the same pitch as the first helical flight, the helical flight secured to said other of the first and second cores being secured only at an outer end of the said other of the first and second cores and being otherwise unconnected thereto, the second flight being in threaded engagement with the first flight whereby relative rotation of the first and second helical flights allows telescoping of the auger to change the combined length of the screw conveyors, first drive means for causing rotation of the first and second auger sections about a common vertical axis at an inner end of the first auger section such that the auger sections can rotate around the vertical axis adjacent a vertical axis of a bin with the first and second screw conveyors transporting the material from the bin toward the vertical axis, second drive means connected to said first core so as to rotatably drive said first screw conveyor about the axis of the core, drive connecting means for communicating rotation from said first screw conveyor to said second screw conveyor being provided solely by contact between said first and second helical flights, such that the second screw conveyor tends to move freely longitudinally outwardly from the first screw conveyor under forces from material transported thereby and means actuable to temporarily inhibit rotation of the second screw conveyor so as to screw the second helical flight inwardly into the first helical flight.

2. The bin sweep according to claim 1 including shroud means extending partly around the screw conveyors and extending along the length thereof, said actuable means comprising brake means attached to said shroud means.

3. The bin sweep according to claim 2 wherein the shroud means includes an open front face facing forwardly in a direction of travel of the screw conveyors around said vertical axis, said front face including a plurality of bars extending longitudinally of the screw conveyors, the bars including telescoping portions for adjustment of the length thereof.

4. The bin sweep according to claim 1 including a third auger section, means coupling the third auger section to an end of the first auger section remote from the second auger section including connecting means allowing rotation of the first and second auger sections relative to a vertical axis defined on the third auger section such that the third auger section can extend from a position inside a bin to a fixed location exteriorly of the bin while the first and second auger sections rotate around the vertical axis within the bin, the connecting means comprising a first substantially right angled rigid tubular elbow connected to the third auger section, a second substantially right angled rigid tubular elbow connected to the end of the first auger section and means coupling the first and second elbows for free rotation about a generally upright axis, including means for supporting the third auger section for transportation of the third auger section with the first auger section coupled thereto and supported thereby in cantilever manner from a bin to a second bin, said supporting means being arranged at an end of the third auger section remote from the connecting means such that the supporting means can be arranged exteriorly of the bin to insert the third auger section and the connecting means into a position adjacent a centre of the bin, and pivot coupling means connecting the end of the first auger to the connecting means, said pivot coupling means allowing pivotal action of the first and second auger sections relative to the first auger section about a substantially horizontal axis transverse to the axis of the first auger section.

5. The bin sweep according to claim 4 including a flexible auger core secured to an end of the first core and to an end of a core of the third auger section, said flexible core extending through said connecting means substantially concentrically therein, a plurality of collars secured to the flexible core at positions spaced therealong, each collar having attached thereto helical flight means for transporting material from the first auger section into the third auger section.

6. The bin sweep according to claim 5 wherein each collar carries a first and a second helical flight portion each separate from the other and lying 180° out of phase with the other and each extending over substantially only 180° around the axis.

7. The bin sweep according to claim 1 including drive means mounted at an end of the second screw conveyor remote from said vertical axis for engaging a floor of the bin to cause rotation of the auger sections around the vertical axis, the drive means comprising a chain sprocket secured to the second core and having a diameter less than that of the second helical flight, chain guide means positioned below the sprocket and the chain entrained around the sprocket and the chain guide means for engagement with the floor for causing driving action in response to rotation of the second core.

8. A bin sweep according to anyone of claims 1 to 7 including means responsive to engagement with an obstacle in the bin for actuating said brake means for retraction of the second helical flight.

9. A bin sweep according to claim 1 including spring biassing means providing a force between the first and second screw conveyors tending to move the second helical flight longitudinally outward.

10. A bin sweep comprising a first auger section having a screw conveyor with a first core and a first helical flight secured therealong so as to be rotatable with the first core about a longitudinal axis of the first core, a second auger section with a second core and a second helical flight secured therealong so as to be rotatable with the second core about a longitudinal axis of the second core, means mounting the first auger section such that it can extend from a first feed end thereof within a bin to be emptied of a stored material to a second discharge end exteriorly of the bin for discharge of the material, means connecting the second auger section to the first end of the first auger section, said connecting means allowing rotation of the second auger section about a vertical axis defined on the first auger section such that the second auger section can rotate around the vertical axis through 360° within the bin to collect the material from an area surrounding said first end, drive means for drivingly rotating said second auger section about said vertical axis, and means for supporting the first auger section for transportation of the first auger section with the second auger section coupled thereto and supported thereby in cantilever manner from a bin to a second bin, said supporting means being arranged at said second discharge end of the first auger section such that the supporting means can be arranged exteriorly of the bin to insert the first auger section, said connecting means and said second auger section into a position adjacent a centre of the bin.

11. The bin sweep according to claim 10 including pivot coupling means connecting the end of the second auger section to the connecting means, said pivot connecting means allowing pivotal action of the second auger section about a substantially horizontal axis.

12. The bin sweep according to claim 10 including a flexible auger core portion secured to an end of the first core of the first auger section and to an end of the second core of the second auger section, said flexible core portion extending through said connecting means substantially concentrically therein, a plurality of collars secured to the flexible core at positions spaced therealong, each collar having attached thereto helical flight means for transporting material from the second auger section through said coupling means into the first auger section.

13. The bin sweep according to claim 12 wherein the connecting means comprises a first substantially ninety degree rigid tubular elbow member, having one end contiguous with the first auger section and a second end spaced therefrom, a second substantially ninety degree rigid tubular elbow member having one end connected to the second auger section and a second end spaced therefrom and a coupling member connecting the second end of the first elbow member to the second end of the second elbow member and defining a bearing element to provide said rotation of the second auger section about said vertical axis, said drive means being mounted at an end of the second core remote from said vertical axis and includes means for engaging a floor of the bin to cause rotation of the second auger section around the vertical axis, said drive means comprising a chain sprocket secured to the second core and having a diameter less than that of the second helical flight, chain guide means positioned below the sprocket and the chain entrained around the sprocket and the chain guide means for engagement with the floor for causing driving action in response to rotation of the second core.

14. The bin sweep according to claim 10 including means for varying the effective length of the second auger section.

15. A bin sweep comprising a first auger section having a screw conveyor with a first core and a first helical flight secured therealong so as to be rotatable with the first core about a longitudinal axis of the first core, a second auger section with a second core and a second helical flight secured therealong so as to be rotatable with the second core about a longitudinal axis of the second core, means mounting the first auger section such that it can extend from a first feed end thereof within a bin to be emptied of a stored material to a second discharge end exteriorly of the bin for discharge of the material, means coupling the second auger section to the first end of the first auger section, said coupling means allowing rotation of the second auger section about a vertical axis defined on the first auger section such that the second auger section can rotate around the vertical axis through 360° within the bin to collect the material from an area surrounding said first end, drive means for drivingly rotating said second auger section about said vertical axis, wherein said drive means comprises a drive element mounted on said second core at an end thereof remote from said vertical axis and drivingly rotatable by said second core about a longitudinal axis of the core, the drive element having a peripheral surface surrounding the axis of the second core, and drive communication means driven by said peripheral surface of said drive element and arranged to communicate rotation of said peripheral surface of the drive element to a floor of the bin for movement of the second auger section around said vertical axis, said peripheral surface having a diameter less than that of a peripheral edge of the second helical flight and said drive communication means being arranged such that the speed of the movement of the second auger around said vertical axis is less than the angular velocity of the peripheral edge of the second helical flight around said axis of the second core.

16. The bin sweep according to claim 15 wherein said drive element comprises a chain sprocket and wherein said drive communication means comprises an endless chain wrapped around and driven by the peripheral surface of the drive element and means guiding said chain loop to form a portion of the path of movement thereof which is straight an in contact with the floor.

17. An auger for transportation of particulate material comprising a first shroud member, a first auger section having a first screw conveyor mounted within the first shroud member with a first core and a first helical flight secured therealong so as to be rotatable with the first core about a longitudinal axis of the first shroud member, a second auger section having a second shroud member, a second screw conveyor mounted within the second shroud member with a second core mounted coaxially with the first core, one of the first and second cores being arranged as a tube such that the other of the first and second cores can slide longitudinally inside the tube, with an outer end of said other of the first and second projecting outwardly from an end of the tube, a second helical flight along the second core and having substantially the same pitch as the first helical flight, the helical flight secured to said other of the first and second cores being secured only at an outer end of the said other of the first and second cores and being otherwise unconnected thereto, the second flight being in threaded engagement with the first flight, said first core being free to rotate relative to the second core, said second shroud member being free to move longitudinally of the first shroud member to increase and decrease a combined effective length of the first and second shroud members, drive means connected to said first core so as to rotatably drive said first screw conveyor about the axis of the first core, drive connecting means for communicating rotation from said first screw conveyor to said second screw conveyor being provided solely by contact between said first and second helical flights, and actuable means arranged to temporarily inhibit rotation of the second screw conveyor relative to the first screw conveyor so as to cause screwing action of the second helical flight relative to the first helical flight to change the effective combined length of the first and second auger sections.

18. An auger according to claim 17 including spring biasing means providing a force between the first and second auger cores tending to change the effective combined length of the first and second auger sections.

19. An auger according to claim 17 wherein said actuable means comprises means for inhibiting force of the particulate material to thereby inhibit the rotation of the second helical flight 20. An auger according to claim 17 wherein the actuable means comprises a brake.

* * * * *